United States Patent [19]

Ayres et al.

[11] Patent Number: 4,592,577
[45] Date of Patent: Jun. 3, 1986

[54] SLEEVE TYPE REPAIR OF DEGRADED NUCLEAR STEAM GENERATOR TUBES

[75] Inventors: Paul S. Ayres, Alliance; Louis E. Stark, Youngstown; Joel G. Feldstein, North Canton; Tzerong Fu, Stow, all of Ohio

[73] Assignee: The Babcock & Wilcox Company, New Orleans, La.

[21] Appl. No.: 425,212

[22] Filed: Sep. 30, 1982

[51] Int. Cl.⁴ .............................................. F16L 13/08
[52] U.S. Cl. ....................................... 285/287; 285/15; 285/370; 285/397; 29/157.3 R; 29/421 E; 228/2.5; 228/263.18
[58] Field of Search ............... 285/287, 284, 286, 397, 285/370, 15; 228/2.5, 263 G; 29/157.3 R, 157.3 C, 421, 421 E

[56] References Cited
U.S. PATENT DOCUMENTS

| | | | |
|---|---|---|---|
| Re. 30,802 | 11/1981 | Rogers, Jr. ....................... | 29/421 R |
| 3,411,198 | 11/1968 | Berman et al. ...................... | 29/421 |
| 3,562,887 | 2/1971 | Schroeder et al. ................. | 29/157.4 |
| 3,912,148 | 10/1975 | Johnson ............................... | 228/2.5 |
| 3,962,767 | 6/1976 | Byerley et al. ..................... | 285/15 X |
| 4,028,789 | 6/1977 | Loch .................................... | 29/157.4 |
| 4,195,390 | 4/1980 | Amen .................................. | 29/421 R |

Primary Examiner—Richard J. Scanlan, Jr.
Attorney, Agent, or Firm—Robert C. Mai; Robert J. Edwards

[57] ABSTRACT

A sealable multimetallic sleeve for a rapid repair of a degraded tube caused by a detrimental chemical attack on the outside surface of the tube within and in a vicinity of a tube sheet in a steam generator, and the method for sealably inserting the sleeve in the degraded tube spanning the region of the degradation. The sleeve includes an inner member with equivalent mechanical properties of the degraded tube and an outer member metallurgically bonded to the inner member and resistive to caustic intergranular chemical attack causing tube degradation. The sleeve has an expanded portion at one end for positioning in the tube within the tube sheet and a multiplicity of grooves in and adjacent to the other end of the sleeve and braze material contained in the grooves.

3 Claims, 4 Drawing Figures

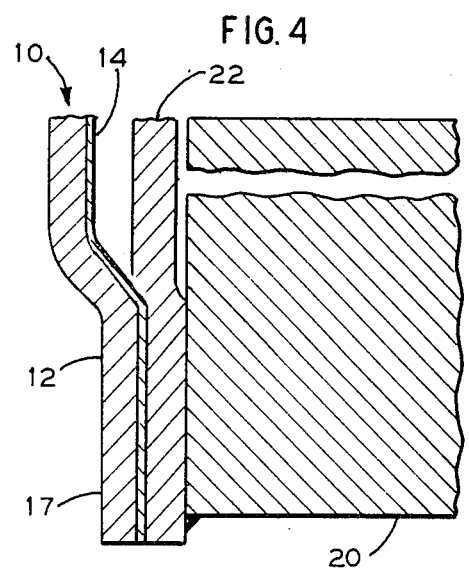

SLEEVE TYPE REPAIR OF DEGRADED NUCLEAR STEAM GENERATOR TUBES

BACKGROUND OF THE INVENTION

1. Field of the Invention

This invention relates to sealable multimetallic tube sleeves and methods of installing these sleeves in degraded nuclear steam generator tubes, and the like.

2. Description of the Prior Art

The economic performance of any power plant is closely related to the availability of the plant. In the nuclear industry, operating experience has demonstrated that the steam generator is a critical component of the plant in maintaining high availability. Steam generator tube leaks affect short term availability through forced outages. In addition, profilometer or eddy current examination of tubing and subsequent plugging of degraded or failed tubes will extend outages. However, this is a minor effect on availability compared to the influence of running at reduced power for extended periods of time, of derating the plant due to insufficient heating surface caused by tube plugging or the complete replacement of the steam generator.

Nuclear steam generators generally fall into two classes: the once-through design with vertically extending straight tubes and upper and lower tube sheets, and the U-tube design with a lower tube sheet from which vertically extending tubes are secured after a 180 degree turn in the upper region of the steam generator. Due to the close spacing of the tubes and operating pressure, ligament efficiency is low requiring tube sheet thicknesses in the order of 24 inches. In the initial assembly of the steam generator, the tubes are expanded for about 3 inches at the lower ends and seal welded to the lower face of the lower tube sheet. A crevice of about 7 mils exists above the expanded portion of the tubes to the top face of the tube sheet. This crevice and the region immediately above the top face of the tube sheet is the site of caustic intergranular attack and stress corrosion of the tubes in operating units. Plugging the tubes obviously removes heating surface and sleeving, heretofore used, is only a temporary expedient since the sleeves will be subject to the same destructive environment as the tube. The problem to be solved is to identify a material suitable for a long-time repair of the degraded tube. This material must meet several requirements: it must have resistiveness to the corrosive environment that caused the original tube to fail, it must have physical and mechanical properties equivalent to those of the original tube, and it must also have the same corrosion resistance on its interior surface exposed to the primary side (tube inside diameter) environment of the heat exchanger as the original tube.

Clearly, there is an urgent need for an improved solution for repairing degraded or leaking steam generator tubes.

SUMMARY OF THE INVENTION

These difficulties are overcome through an improved sleeve design and installation method. Illustratively, a sleeve design has been developed and tested which will insure a 40-year expected life of a nuclear steam generator and a rapid installation method to minimize exposure to radiation of repair personnel.

The various features of novelty which characterize the invention are pointed out with particularity in the claims annexed to and forming a part of this disclosure.

For a more complete understanding of the invention, its operating advantages and installation procedures, reference should be made to the accompanying drawings and descriptive matter in which there is illustrated and described a preferred embodiment of the invention.

BRIEF DESCRIPTION OF THE DRAWINGS

FIG. 4 is an enlarged view of a lower portion of FIG. 2 showing the sleeve in greater detail.

DETAILED DESCRIPTION OF THE DRAWINGS

Figure 1:
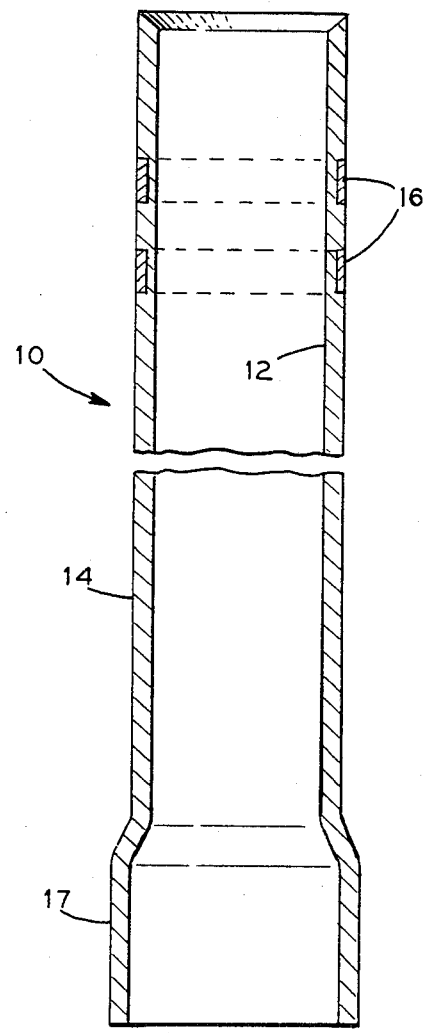
FIG. 1 is a sectional elevation view of a multimetallic sleeve embodying features of the invention.
Figure 2:
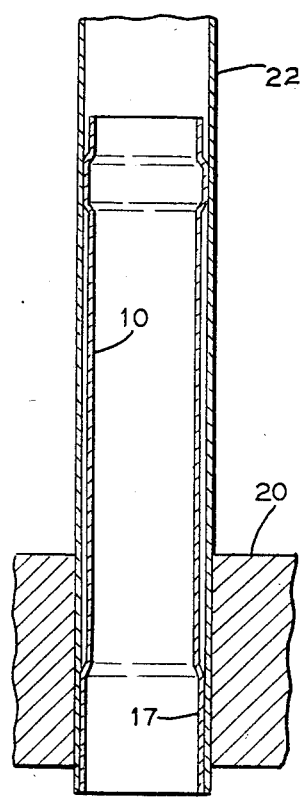
FIG. 2 is a part schematic view showing the position of a sleeve in one tube of a nuclear steam generator.
Figure 3:
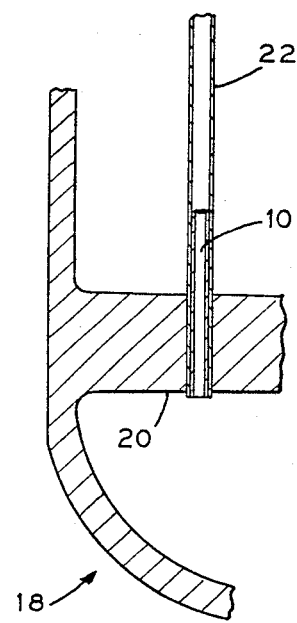
FIG. 3 shows in detail the features of an installed sleeve in a steam generator tube.

Referring to FIGS. 1, 2, 3, and 4 shown is a multimetallic sleeve 10 prepared in accordance with the invention before and after installation in a steam generator 18. An inner core member 12 consists of a material compatible with the tube material to which it is attached. For example, in sleeving Inconel-600 tubes, the inner member 12 of the sleeve 10 will also be composed of Inconel-600. Inconel-600 is an alloy of nickel, chromium and iron in the composition ranges by weight of 72% minimum, 14 to 17% and 6 to 10% respectively. For improved corrosion resistance the inner member 12 is subjected to a heat treatment at 1325 F.±50 F. for for about 15 hours and slow-cooled to room temperature, producing a stress relieved condition. The outer member 14 consists of a nickel alloy with a minimum content of 99% by weight of nickel or of pure nickel. Outer member 14 and inner member 12 are co-extruded at high temperature producing a diffusion-bonded sleeve 10. The lower end 17 of sleeve 10 is expanded over a length of about ¾ of an inch to an outside diameter slightly less than the inside diameter of the tube 22 in which it is inserted for positioning of the sleeve 10 within tube 22. The upper end of sleeve 10 has two annular rings 16, ¼ inch wide and spaced ¼ inch apart which are prebrazed with a filler metal in a vacuum furnace. The upper edge of the upper ring 16 is one inch from the top of sleeve 10. The filler metal is a brazing material preferably of an alloy of 82% gold and 18% nickel by weight. This material was selected due to its corrosion resistance, material availability, good brazing characteristics and good strength and ductility. A typical tube sleeve 10 will have an outside diameter of 0.75 inch and a total wall thickness of 0.05 inch with the outer member 14 having a thickness of 0.005 inch and the inner member a thickness of 0.045 inch. The overall length of the sleeve 10 is 36 inches and when installed in a tube 22 in a tube sheet 20 will extend about 12 inches within the steam generator above the upper face of the tube sheet 20, spanning the defective area of the tube 22. The invention presents the best material option for duty as a sleeve repair device in a nuclear steam generator tube that has been (and will continue to be) degraded by caustic intergranular attack on the outside diameter of the tube 22. This is a direct consequence of the use on the outer portion of the sleeve 10 of an alloy with a minimum nickel content of 99% by weight, or of pure nickel, as a barrier to the caustic attack. These high nickel content materials are much less susceptible to caustic intergranular attack than is Inconel-600. While the nickel material has these desired corrosion resistive properties, it does not have attractive mechanical properties. Thus, if one chose to use pure nickel for the entire sleeve 10, the wall thickness of such a sleeve would be significantly larger than that of the subject invention. This would force a reduction in the inside diameter of the sleeve which would result in a reduction in fluid flow through the repaired tube 22, equivalent to plugging many of the degraded tubes thus defeating the purpose of the sleeve repair.

The sleeve installation process includes the following basic installation steps.
 a. Clean the Steam Generator Tube 22.
 b. Insert the sleeve 10 and expand the upper end.
 c. Braze sleeve 10 to tube 22 at upper attachment.
 d. Explosively weld the sleeve 10 to tube 22 at the lower attachment.

Since these steps each involve a tooling change, a batch process wherein the same operation is performed on a group of tubes 22 will minimize tooling changes. Batch sizes are flexible to match the requirements of the job.

Installation of the sleeve 10 requires the removal of loose oxides from the tube 22 in the vicinity of the explosive weld and cleaning the tube to bare metal in the vicinity of the braze. Cleaning is accomplished using a combination hone and swab. In the braze region the cleaning operation takes two minutes. Thirty seconds is sufficient at the explosive weld.

After cleaning a batch of steam generator tubes, sleeves are inserted into the tubes and explosively expanded in the braze region. A cartridge is inserted into the sleeve 10 outside the steam generator 18 and the assembly is inserted into a tube 22 and the cartridge is detonated expanding the sleeve 10 into the tube 22 over a two inch length in the braze region. The tube 22 is expanded to a range of between 3 to 12 mils forming a mechanical joint with the sleeve 10 which supports the sleeve 10 during subsequent operations. The spent explosive cartridge is then removed.

After sleeve 10 insertion and expansion, a batch of sleeves 10 are brazed to the tubes 22 at the upper joint. Brazing is initiated by a water cooled induction heater which uses a fiber optic system to measure and control the temperature cycle.

Before activating of the induction heater in the sleeve 10 to be brazed, argon flow is established for 5 minutes from the opposite tube end from the end being sleeved. Flow of gas for the first 5 minutes is controlled to 50 cubic feet per hour. After this flow rate and time requirments have been met, the gas flow is reduced to 20 CFH and the induction heater is inserted and is accurately positioned relative to the sleeve expanded area and braze rings 16. When the braze temperature of between 1800° F. and 1880° F. is reached, an automatic controller holds the temperature for a minimum of two minutes. After the two minute braze hold, the temperature is reduced to between 1500° F. and 1550° F. and the temperature is held again for 5 minutes to thermally treat the Inconel-600 sleeve 10 and tube 22. Following the thermal treatment, power is shut off to the induction heater and which is then removed.

Explosively welding the sleeve 10 to the tube 22 near the lower face of the tubesheet 20 is the final step in the sleeve installation process. An explosive weld cartridge is then inserted into sleeve 10 and detonated.

The detonation shatters the weld cartridge and welds the sleeve 10 to the tubing 22. Following the detonation of a batch of the weld cartridges, the debris is removed from the steam generator 18 head. After detonation, the sleeve 10 is welded to the tube 22 over about a one-inch length from about 1½ to 2½ inches from the lower end of tube 22. The explosive welding process also expands the sleeve 10 to the tube 22 for a length of ½ inch above and below the one-inch welded region.

To accomplish the objectives of increasing installation rates and reducing man-rem exposure requires the integration of the sleeve design, installation process and tooling. Certain process times will be inherent in the installation. The tooling must minimize the time required to locate and position the tooling at the tube end and reliably perform the specific operation. In addition the tooling must accomplish as much as possible remotely, with a minimum of man machine interface to keep radiation exposure low.

The tooling concept developed to accomplish the above involves the operation of automated tooling from outside the containment. A command center is used which is located outside the radiation area. From this command center all tooling operations can be controlled and monitored. Men, located near the steam generator and in constant communication with the command center, feed an automatic manipulator located in the steam generator head with the appropriate tools, sleeves and consumables to install the sleeves.

We claim:

1. A sealable sleeve for insertion into the repair of a degraded tube comprising:
 a hollow core inner member of the same material as the degraded tube;
 a thinner outer member of substantially pure nickel and resistant to corrosive attack, the outer member being metallurgically bonded with the inner member;
 an expanded portion of the sleeve at one end for positioning in the tube within a tube sheet;
 a multiplicity of grooves formed in and adjacent to the other end of the sleeve which extends into the free-standing portion of the tube beyond the tube sheet, and
 a noble metal braze material contained in said grooves.

2. The sealable sleeve of claim 1 wherein the inner core member has been subjected to a heat treatment at 1325 F.±50 F. for approximately 15 hours for improved corrosion resistance in the material.

3. The sealable sleeve of claim 1 wherein the sleeve length is materially greater than the thickness of the tube sheet in which the sleeve is installed.

* * * * *